(12) United States Patent
Ji et al.

(10) Patent No.: US 10,505,463 B2
(45) Date of Patent: Dec. 10, 2019

(54) LLC RESONANT CONVERTER AND ELECTRONIC DEVICE

(71) Applicant: SOLUM CO., LTD., Yongin-si (KR)

(72) Inventors: Sang-keun Ji, Seoul (KR); Sang-kyoo Han, Daejeon (KR); Hyun-su Gu, Seoul (KR); Hyo-hun Kim, Incheon (KR); Dong-kyun Ryu, Seoul (KR); Heung-gyoon Choi, Suwon-si (KR)

(73) Assignee: SOLUM CO., LTD., Yongin-si (KR)

( * ) Notice: Subject to any disclaimer, the term of this patent is extended or adjusted under 35 U.S.C. 154(b) by 0 days.

(21) Appl. No.: 15/972,050

(22) Filed: May 4, 2018

(65) Prior Publication Data

US 2018/0342958 A1 Nov. 29, 2018

(30) Foreign Application Priority Data

May 26, 2017 (KR) .................. 10-2017-0065562

(51) Int. Cl.
| | |
|---|---|
| *H02M 7/219* | (2006.01) |
| *H02M 7/25* | (2006.01) |
| *H02M 1/42* | (2007.01) |
| *H02M 3/335* | (2006.01) |
| *H02M 1/088* | (2006.01) |
| *H02M 1/00* | (2006.01) |

(52) U.S. Cl.
CPC ....... *H02M 3/33569* (2013.01); *H02M 1/088* (2013.01); *H02M 2001/0054* (2013.01)

(58) Field of Classification Search
CPC ......... H02M 3/33569; H02M 3/33546; H02M 1/08; H02M 7/219; H02M 7/25; H02M 1/4233; H02M 1/4241; H02M 3/3353; H02M 3/33592; H02M 7/2176
See application file for complete search history.

(56) References Cited

U.S. PATENT DOCUMENTS

| | | | |
|---|---|---|---|
| 9,379,628 B2 | 6/2016 | Zambetti et al. | |
| 2010/0328968 A1* | 12/2010 | Adragna | H02M 3/335 363/21.02 |
| 2013/0229829 A1* | 9/2013 | Zhang | H02M 3/33546 363/16 |
| 2014/0111016 A1* | 4/2014 | He | H02M 3/285 307/82 |

(Continued)

FOREIGN PATENT DOCUMENTS

| | | |
|---|---|---|
| EP | 2736158 A2 | 5/2014 |
| JP | 2002223565 A | 9/2002 |

(Continued)

OTHER PUBLICATIONS

EP Office Action & Search report dated Oct. 19, 2018.

(Continued)

*Primary Examiner* — Jeffrey A Gblende
*Assistant Examiner* — Sisay G Tiku

(57) ABSTRACT

An LLC resonant converter and an electronic device are provided. The LLC resonant converter according to the present disclosure includes a multi input transformer, first and second converter units connected to a primary side of the multi input transformer, an input voltage part, a first balance capacitor, and an output part connected to a secondary side of the multi input transformer.

9 Claims, 11 Drawing Sheets

(56) References Cited

U.S. PATENT DOCUMENTS

| | | | |
|---|---|---|---|
| 2014/0198536 A1* | 7/2014 | Fu | H02M 3/33546 363/17 |
| 2016/0006361 A1* | 1/2016 | Park | H02M 3/33546 315/291 |
| 2016/0049883 A1 | 2/2016 | Casey et al. | |
| 2016/0072388 A1* | 3/2016 | Dubus | H02M 3/1584 363/25 |
| 2017/0025963 A1* | 1/2017 | Otake | H02M 1/08 |
| 2017/0110969 A1* | 4/2017 | Zhou | H02M 3/33507 |
| 2017/0149336 A1* | 5/2017 | Kidera | H02M 7/483 |
| 2017/0155321 A1* | 6/2017 | Kidera | H02M 7/483 |
| 2017/0310242 A1* | 10/2017 | Kifuji | H02M 7/49 |
| 2018/0294732 A1* | 10/2018 | Ye | H02M 3/33546 |

FOREIGN PATENT DOCUMENTS

| | | |
|---|---|---|
| KR | 10-1385979 B1 | 4/2014 |
| KR | 10-1464478 B1 | 11/2014 |

OTHER PUBLICATIONS

B.R. Lin et al. "Parallel Resonant Converter with Flying Capacitor". IEEE. 2013.

M. Chen et al. "A High-Power-Density Wide-Input-Voltage-Range Isolated dc-dc Converter having a MultiTrack Architecture". IEEE. 2015.

I.O. Lee et al. "Analysis and Design of a Three-Level LLC Series Resonant Converter for High and Wide Input Voltage Applications". IEEE. 2012.

\* cited by examiner

LLC RESONANT CONVERTER AND ELECTRONIC DEVICE

CROSS-REFERENCE TO RELATED APPLICATIONS

This application claims priorities from Korean Patent Application No. 10-2017-0065562, filed on May 26, 2017 in the Korean Intellectual Property Office, the disclosure of which is incorporated herein by reference in its entirety.

BACKGROUND OF THE INVENTION

Field of the Invention

Apparatuses consistent with the present disclosure relate to an LLC resonant converter and an electronic device, and more particularly, to an LLC resonant converter and an electronic device capable of implementing a high frequency driving and a switching voltage balancing.

Description of the Related Art

Micro and very large scale power supplies are recently emerging as key technologies of an electronic device. Accordingly, a high frequency driving is necessarily required to minimize a size of a reactive element such as a transformer or an output capacitor that occupies the largest volume in a power supply circuit.

When a general power semiconductor switch is turned on and turned off, there is switching loss that occurs when switch current and voltage overlap each other, and the switching loss exhibits characteristics that it is increased in proportion to a switching frequency.

When an LLC resonant converter is turned off, turn off loss occurs by the overlap of the switch voltage and current. Since the turn off loss is increased as a voltage and a current across a switch become larger and the switching frequency becomes higher, the turn off loss causes a limitation in high power density and miniaturization. In addition, the conventional LLC resonant converter has a problem of high voltage stress due to a voltage unbalance.

SUMMARY OF THE INVENTION

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides an LLC resonant converter and an electronic device having low voltage stress to implement a high frequency driving and to improve efficiency.

According to an aspect of the present disclosure, an LLC resonant converter includes a multi input transformer; first and second converter units configured to be connected to a primary side of the multi input transformer; an input voltage part configured to apply a voltage to both ends at which a plurality of converter units are connected in series with each other; a first balance capacitor configured to maintain a voltage between the plurality of converter units to be consistent; and an output part configured to be connected to a secondary side of the multi input transformer, wherein the first converter unit includes a first part in which a first switch and a first resonance capacitor are connected in series with each other and a second part in which a second switch and a second resonance capacitor are connected in series with each other, the first part, the second part, and a primary side winding of the transformer are connected in parallel to each other, the first switch and the second switch are connected to each other, and the first resonance capacitor and the second resonance capacitor are connected to each other, the second converter unit includes a third part in which a third switch and a third resonance capacitor are connected in series with each other and a fourth part in which a fourth switch and a fourth resonance capacitor are connected in series with each other, the third part, the fourth part, and a secondary side winding of the transformer are connected in parallel to each other, the third switch and the fourth switch are connected to each other, and the third resonance capacitor and the fourth resonance capacitor are connected to each other, and the first balance capacitor is connected to a node between the first switch and the second switch and a node between the third switch and the fourth switch.

The first balance capacitor may have capacitance greater than the first to fourth resonance capacitors.

The first and second resonance capacitors may have the same capacitance, and the third and fourth resonance capacitors may have the same capacitance.

The voltage applied to the first converter unit may be equal to a voltage charged in the first balance capacitor when the first switch and the third switch are turned on, and the voltage applied to the second converter unit may be equal to the voltage charged in the first balance capacitor when the second switch and the fourth switch are turned on.

Primary coils of the multi input transformer connected to the first and second converter units may be wound around the same core as a secondary coil of the multi input transformer.

Primary coils of the multi input transformer connected to the first and second converter units may have the same number of turns.

The LLC resonant converter may further include a third converter unit and a second balance capacitor, wherein the third converter unit includes a fifth part in which a fifth switch and a fifth resonance capacitor are connected in series with each other and a sixth part in which a sixth switch and a sixth resonance capacitor are connected in series with each other, the fifth part, the sixth part, and a third input side winding of the transformer are connected in parallel to each other, the fifth switch and the sixth switch are connected to each other, and the fifth resonance capacitor and the sixth resonance capacitor are connected to each other, and the second balance capacitor has one end connected to a node between the third switch and the fourth switch and a node between the fifth switch and the sixth switch, and the other end connected to one end of the first balance capacitor.

The first balance capacitor and the second balance capacitor may have the same capacitance.

The first and second balance capacitors may have capacitance greater than the first resonance capacitor to the sixth resonance capacitor.

The voltage applied to the first converter unit may be equal to a voltage charged in the first balance capacitor when the first switch, the third switch, and the fifth switch are turned on, the voltage applied to the second converter unit may be equal to a voltage charged in the second balance capacitor when the first switch, the third switch, and the fifth switch are turned on, and may be equal to the voltage charged in the first balance capacitor when the second switch, the fourth switch, and the sixth switch are turned on, the voltage applied to the third converter unit may be equal to the voltage charged in the second balance capacitor when the second switch, the fourth switch, and the sixth switch are turned on, and the voltages charged in the first balance capacitor and the second balance capacitor, respectively, may be equal to each other.

According to another aspect of the present disclosure, an electronic device includes an LLC resonant converter; and a processor configured to control the LLC resonant converter, wherein the LLC resonant converter includes a multi input transformer; first and second converter units configured to be connected to a primary side of the multi input transformer; an input voltage part configured to apply a voltage to both ends at which the plurality of converter units are connected in series with each other; a first balance capacitor configured to maintain a voltage between the plurality of converter units to be consistent; and an output part configured to be connected to a secondary side of the multi input transformer, the first converter unit includes a first part in which a first switch and a first resonance capacitor are connected in series with each other and a second part in which a second switch and a second resonance capacitor are connected in series with each other, the first part, the second part, and a primary side winding of the transformer are connected in parallel to each other, the first switch and the second switch are connected to each other, and the first resonance capacitor and the second resonance capacitor are connected to each other, the second converter unit includes a third part in which a third switch and a third resonance capacitor are connected in series with each other and a fourth part in which a fourth switch and a fourth resonance capacitor are connected in series with each other, the third part, the fourth part, and a secondary side winding of the transformer are connected in parallel to each other, the third switch and the fourth switch are connected to each other, and the third resonance capacitor and the fourth resonance capacitor are connected to each other, the first balance capacitor is connected to a node between the first switch and the second switch and a node between the third switch and the fourth switch, and the processor performs a control so that the first switch and the third switch are simultaneously turned on and the second switch and the fourth switch are turned on.

According to the diverse exemplary embodiments of the present disclosure, when the multi input LLC resonant converter is implemented, the voltage balance of all switch elements may be implemented by only the passive elements instead of the semiconductor elements for digital control and clamp. In addition, since the resonance capacitor may serve as the input capacitor, the circuit may be simply and inexpensively implemented.

The multi input LLC resonant converter according to the present disclosure may use the switch having a low withstand voltage, may reduce conduction loss, and is advantageous for the high frequency driving due to low gate charge. In addition, since a voltage across the switch is switched to $V_{in}/n$, the turn off loss that occurs due to the overlap of the voltage and the current when the switch is turned off may be relatively small.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
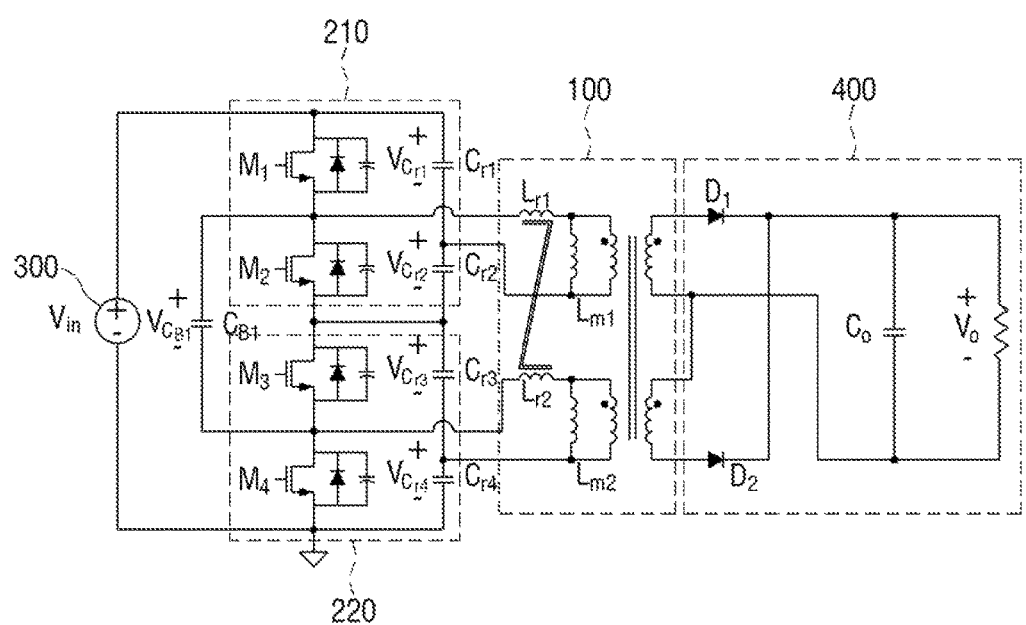
FIG. 1 is a circuit diagram illustrating an LLC resonant converter according to an exemplary embodiment of the present disclosure.

Hereinafter, diverse exemplary embodiments of the present disclosure will be described with reference to the accompanying drawings. However, it is to be understood that technologies mentioned in the present disclosure are not limited to specific exemplary embodiments, but include all modifications, equivalents, and substitutions according to exemplary embodiments of the present disclosure. Throughout the accompanying drawings, similar components will be denoted by similar reference numerals.

In addition, expressions "first", "second", or the like, used in the present disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the 'first' component may be named the 'second' component and the 'second' component may also be similarly named the 'first' component without departing from the scope of the present disclosure.

Terms used in the present disclosure may be used only in order to describe specific exemplary embodiments rather than restricting the scope of other exemplary embodiments. Singular forms may include plural forms unless the context clearly indicates otherwise. Terms used in the present specification including technical and scientific terms have the same meanings as those that are generally understood by those skilled in the art to which the present disclosure pertains. Terms defined by a general dictionary among terms used in the present disclosure may be interpreted as meaning that are the same as or similar to meanings within a context of the related art, and are not interpreted as ideal or excessively formal meaning unless clearly defined in the present disclosure. In some cases, terms may not be interpreted to exclude exemplary embodiments of the present disclosure even though they are defined in the present disclosure.

Hereinafter, exemplary embodiments of the present disclosure will be described in detail with reference to the accompanying drawings.

Referring to FIG. 1, an LLC resonant converter according to an exemplary embodiment of the present disclosure includes a multi input transformer 100, a first converter unit 210, a second converter unit 220, an input voltage part 300, an output part 400, and a first balance capacitor CB1.

Figure 2:
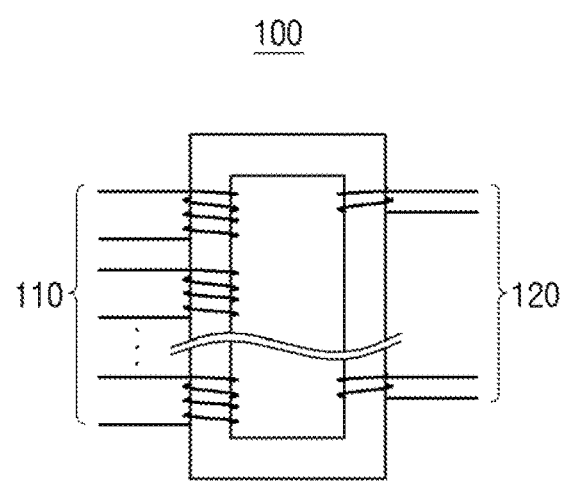
FIG. 2 is a schematic diagram illustrating primary and secondary coils wound around a transformer according to the present disclosure.

FIG. 2 illustrates a configuration of a multi input transformer.

A multi input transformer 100 may have a plurality of primary coils, which are an input side winding 110, and two secondary coils, which are an output side winding 120, which are wound around one magnetic core. The primary coils and the secondary coils may also be wound around a plurality of magnetic cores. Each of the primary coils, which are the input side winding 110, may be connected to each of the converter units 210 and 220.

The first converter unit 210 includes a first part in which a first switch $M_1$ and a first resonance capacitor $C_{r1}$ are connected in series with each other, and a second part in which a second switch $M_2$ and a second resonance capacitor $C_{r2}$ are connected in series with each other.

The first part, the second part, and the first input side winding of the transformer are connected in parallel to each other, the first switch $M_1$ and the second switch $M_2$ are connected to each other, and the first resonance capacitor $C_{r1}$ and the second resonance capacitor $C_{r2}$ are connected to each other. The first input side winding, which is an equivalent circuit, is expressed as a first resonance inductor $L_{r1}$ and a first magnetized inductor Lm1. The first resonance capacitor $C_{r1}$, the second resonance capacitor $C_{r2}$, the first resonance inductor $L_{r1}$, and the first magnetized inductor $L_{m1}$ may generate LLC resonance.

Similarly, to the first converter unit, the second converter unit includes a third part in which a third switch $M_3$ and a third resonance capacitor $C_{r3}$ are connected in series with each other, and a fourth part in which a fourth switch $M_4$ and a fourth resonance capacitor $C_{r4}$ are connected in series with each other.

The third part, the fourth part, and the second input side winding of the multi input transformer 100 are connected in parallel to each other, the third switch $M_3$ and the fourth switch $M_4$ are connected to each other, and the third resonance capacitor $C_{r3}$ and the fourth resonance capacitor $C_{r4}$ are connected to each other. The second input side winding, which is an equivalent circuit, is expressed as a second resonance inductor $L_{r2}$ and a second magnetized inductor $L_{m2}$.

The third resonance capacitor $C_{r3}$, the fourth resonance capacitor $C_{r4}$, the second resonance inductor $L_{r2}$, and the second magnetized inductor $L_{m2}$ may generate LLC resonance. In this case, the LLC resonant converter may minimize a variation of an operation frequency for a wide load variation, it is possible to secure a stable operation and control.

Here, all of the respective resonance capacitors $C_{r1}$, $C_{r2}$, $C_{r3}$, and $C_{r4}$ may have the same capacitance. The respective primary coils may have the same number of turns and the respective secondary coils may also have the same number of turns.

Of course, in a case in which the settings of the resonance frequency may be matched to be equal to each other, the elements of different converter units may have different values.

Hereinafter, a converter unit will be described with reference to FIG. 3.

Figure 3:
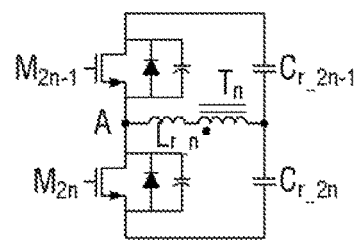
FIG. 3 is a circuit diagram illustrating a converter unit.

FIG. 3 is a circuit diagram illustrating a converter unit.

Referring to FIG. 3, the converter unit has a configuration in which two switches $M_{2n-1}$ and $M_{2n}$ and two capacitors $Cr_{2n-1}$ and $Cr_{2n}$ are connected to each other, and a primary winding $T_n$ of the multi input transformer 100 is connected to a node between the two switches $M_{2n-1}$ and $M_{2n}$ and to a node between the two resonance capacitors $Cr_{2n-1}$ and $Cr_{2n}$. A node A illustrated in FIG. 3 is connected to a balance capacitor.

Here, the respective resonance capacitors $Cr_{2n-1}$ and $Cr_{2n}$ may have the same capacitance as each other.

Referring back to FIG. 1, the first and second converter units 210 and 220 are connected in series with each other and a first balance capacitor $C_{b1}$ is connected to a node A between the two converter units. The first balance capacitor $C_{b1}$ serves to keep voltages $V_{cr1}$ and $V_{cr2}$ across the first and second converter units 210 and 220 to be consistent.

The input voltage part 300 applies a voltage across the first and second converter units 210 and 220 which are connected in series with each other, and the input voltage part 300 may be a direct current (DC) power source.

The output part 400 may be connected to the secondary winding of the multi input transformer 100 and may include diodes $D_1$ and $D_2$ that operate as rectifiers.

Hereinafter, an operation principle of the LLC resonant converter according to an exemplary embodiment of the present disclosure will be described.

In the LLC resonant converter according to an exemplary embodiment of the present disclosure, the first switch $M_1$ and the third switch $M_3$ operate as a pair, and the second switch $M_2$ and the fourth switch $M_4$ operate as a pair.

Figure 4:
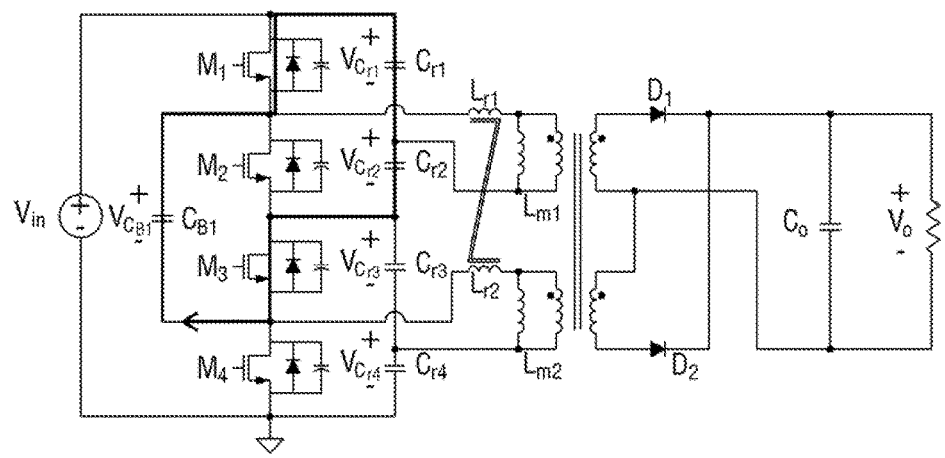
FIGS. 4 and 5 are circuit diagrams illustrating a process in which a voltage balance between converter units according to an operation of a switch is implemented in an LLC resonant converter according to an exemplary embodiment of the present disclosure.
Figure 5:
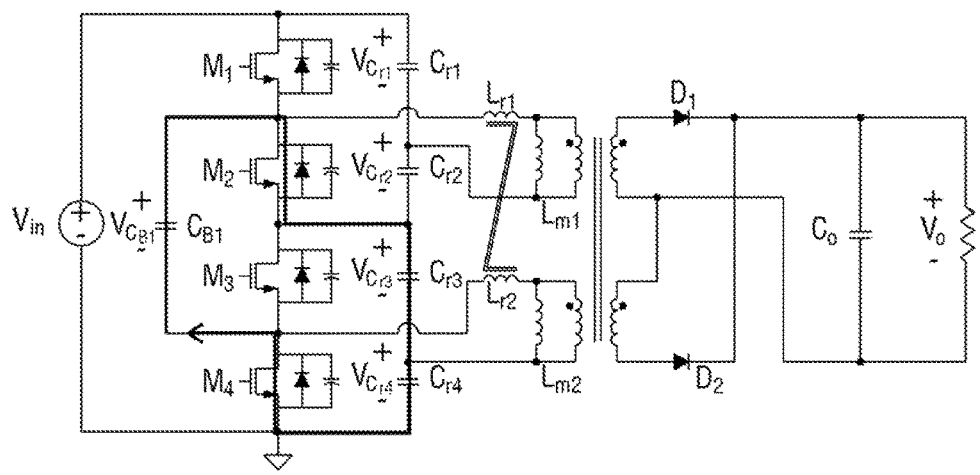

FIGS. 4 and 5 are circuit diagrams illustrating a process in which a voltage balance between converter units according to an operation of a switch is implemented in an LLC resonant converter according to an exemplary embodiment of the present disclosure.

FIG. 4 illustrates a case in which the first switch $M_1$ and the third switch $M_3$ are turned on. If the Kirchhoff's voltage law (KVL) is applied along a mesh indicated in a direction of an arrow, a voltage $V_{CB1}$ across of the first balance capacitor $C_{B1}$ and a voltage $V_{Cr1}+V_{Cr2}$ across the first converter unit 210 are the same as each other.

FIG. 5 illustrates a case in which the second switch $M_2$ and the fourth switch $M_4$ are turned on. If the Kirchhoff's voltage law is applied along a mesh indicated in a direction of an arrow, the voltage $V_{CB1}$ across the first balance capacitor $C_{B1}$ and a voltage $V_{Cr3}+V_{Cr4}$ across the second converter unit 220 are the same as each other.

Here, since the first balance capacitor $C_{B1}$ has capacitance greater than the first to fourth resonance capacitors $C_{r1}$, $C_{r2}$, $C_{r3}$, and $C_{r4}$, the voltages across the first and second converter units 210 and 220 are determined by the first balance capacitor $C_{B1}$. In a case in which the first balance capacitor $C_{B1}$ has small capacitance, the voltage $V_{CB1}$ of the first balance capacitor $C_{B1}$ is determined by the first to fourth resonance capacitors $C_{r1}$, $C_{r2}$, $C_{r3}$, and $C_{r4}$, a voltage balance may not occur.

Therefore, if a value of the first balance capacitor $C_{B1}$ is large, the following Mathematical Expression is established.

$$V_{CB1}=V_{Cr1}+V_{Cr2}=V_{Cr3}+V_{Cr4}$$

$V_{Cr1}+V_{Cr2}+V_{Cr3}+V_{Cr4}$, which is a sum of voltages of all resonance capacitors, is equal to an input voltage $V_{in}$.

$$V_{in}=V_{Cr1}+V_{Cr2}+V_{Cr3}+V_{Cr4}$$

Therefore, the voltages of all switches are guaranteed to $V_{in}/2$ by the above-mentioned Mathematical Expression.

In addition, the first to fourth resonance capacitors are connected in parallel to an input power source and also serve as an input capacitor. Therefore, it is possible to simply the element and to reduce the cost.

FIGS. 6 to 9 are circuit diagrams illustrating a flow of current for each of the modes according to an operation of a switch in the LLC resonant converter according to an exemplary embodiment of the present disclosure.

Figure 10:
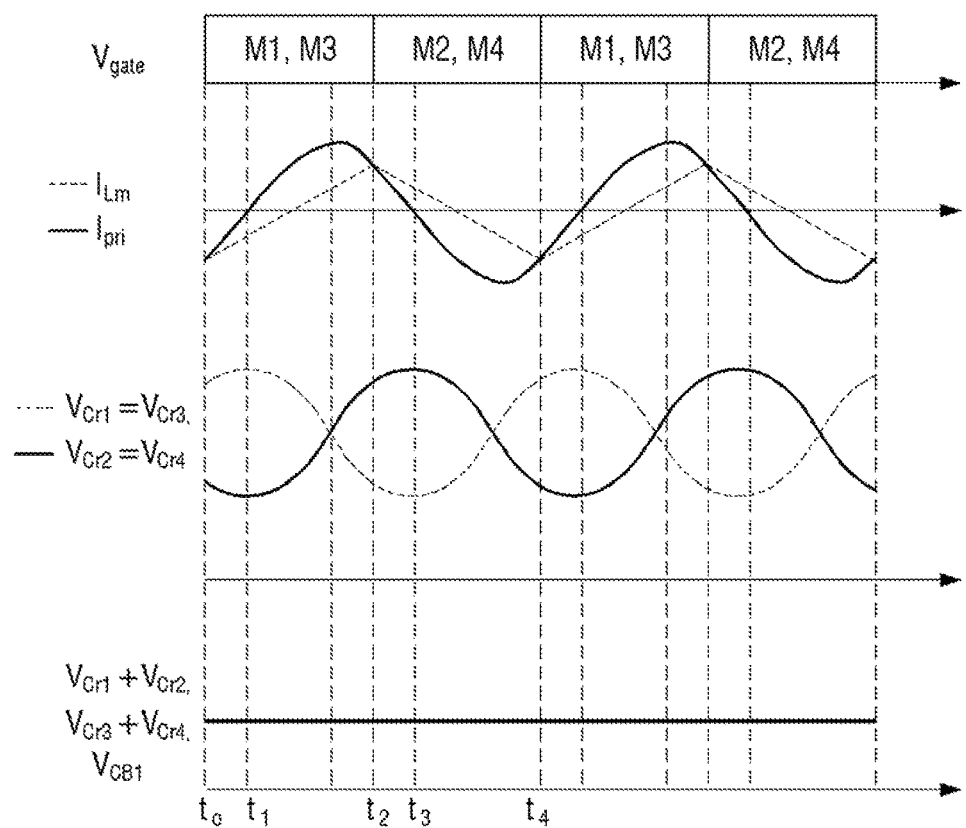
FIG. 10 is a diagram illustrating magnitude of a voltage and amplitude of a current according to each of the modes.

FIG. 10 is a diagram illustrating waveforms of a voltage and a current according to each of the switching modes.

For the description of operations of FIGS. 6 to 9, the following assumption is made.

Parasitic components other than components illustrated in the drawings are negligibly small. All operations are operated in a steady state. An output capacitor $C_o$ is very large for an output voltage to be constant. A dead time between switch driving signals for preventing arm short is negligibly short.

The first and second resonance capacitors $C_{r1}$ and $C_{r2}$ resonate with the resonance inductor $L_{r1}$ of the primary side of the multi input transformer, and the third and fourth resonance capacitors $C_{r3}$ and $C_{r4}$ resonate with the resonance inductor $L_{r2}$ of the primary side of the multi input transformer.

Figure 6:
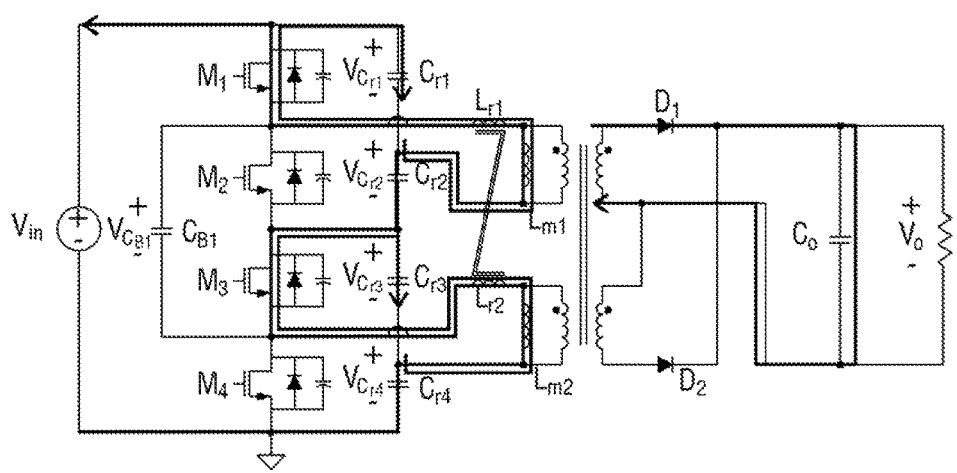
FIGS. 6 to 9 are circuit diagrams illustrating a flow of current for each of the modes according to an operation of a switch in the LLC resonant converter according to an exemplary embodiment of the present disclosure.

When the first and third switches $M_1$ and $M_3$ are turned on ($t=t_0$), a first mode starts. A conduction path as illustrated in FIG. 6 is formed.

As illustrated in FIG. 10, in the first mode, a primary current $I_{pri}$ is rising, but still in a negative direction, the first and third resonance capacitors are charged and the second and fourth resonance capacitors are discharged. In addition, a current flowing toward an ideal transformer is determined using the Kirchhoff's current law (KCL). Therefore, a primary side current of the transformer flows so as to enter a primary side dot direction of the transformer. Therefore, a secondary side current of the transformer flows so as to exit from a secondary side dot direction of the transformer. The first mode ends when the primary side current $I_{pri}$ flows in a positive direction ($t=t_1$). In this case, the first balance capacitor voltage $V_{CB1}$ is equal to the sum $V_{Cr1}+V_{Cr2}$ of the voltages across the first and second resonance capacitors.

Figure 7:
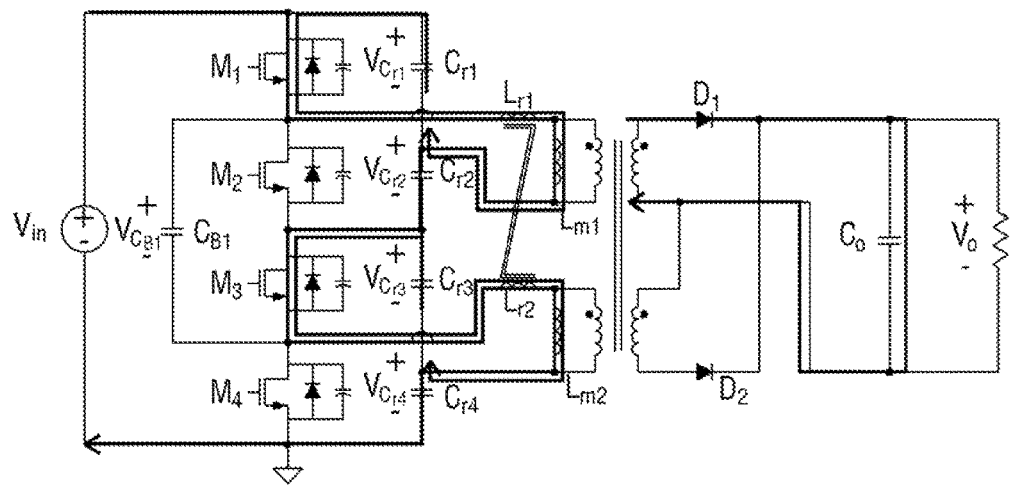

When the primary side current $I_{pri}$ flows in the positive direction ($t=t_1$), a second mode starts. A conduction path as illustrated in FIG. 7 is formed.

As illustrated in FIG. 10, since the primary side current $I_{pri}$ flows in the positive direction, the first and third resonance capacitors are discharged and the second and fourth resonance capacitors are charged. In addition, a current flowing toward an ideal transformer is determined using the Kirchhoff's current law (KCL). Therefore, the primary side current of the transformer flows so as to enter a primary side dot direction of the transformer. Therefore, a secondary side current of the transformer flows so as to exit from a secondary side dot direction of the transformer.

The second mode ends when the first and third switches $M_1$ and $M_3$ are turned off ($t=t_2$). In this case, the first balance capacitor voltage $V_{CB1}$ is equal to the sum $V_{Cr1}+V_{Cr2}$ of the voltages across the first and second resonance capacitors.

Figure 8:
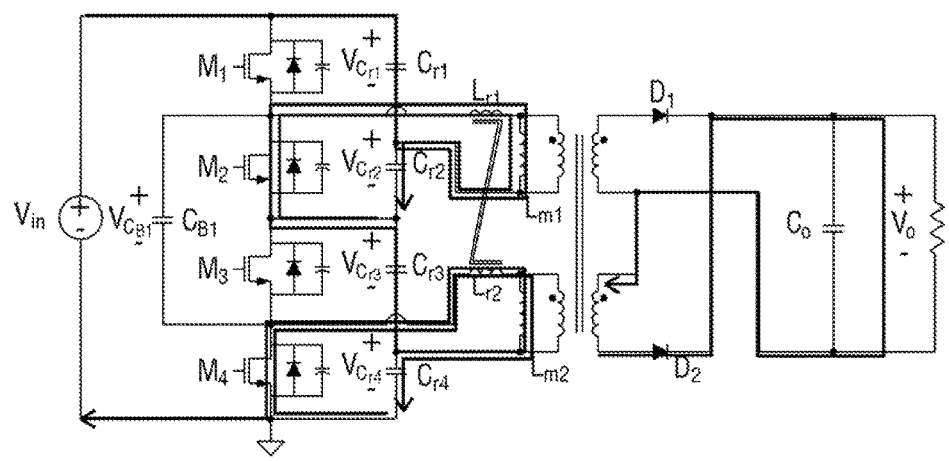

When the second and fourth switches $M_2$ and $M_4$ are turned on ($t=t_2$), a third mode starts. A conduction path as illustrated in FIG. 8 is formed.

As illustrated in FIG. 10, the primary side current $I_{pri}$ is decreasing, but still in the positive direction, the first and third resonance capacitors are discharged and the second and fourth resonance capacitors are charged. In addition, a current flowing toward an ideal transformer flows so as to exit from the primary dot direction of the transformer along the Kirchhoff's current law (KCL). Therefore, a secondary side current of the transformer flows so as to enter a secondary side dot direction of the transformer.

The third mode ends when the primary side current $I_{pri}$ flows in the negative direction ($t=t_3$). In this case, the first balance capacitor voltage $V_{CB1}$ is equal to the sum $V_{Cr1}+V_{Cr2}$ of the voltages across the first and second resonance capacitors.

Figure 9:
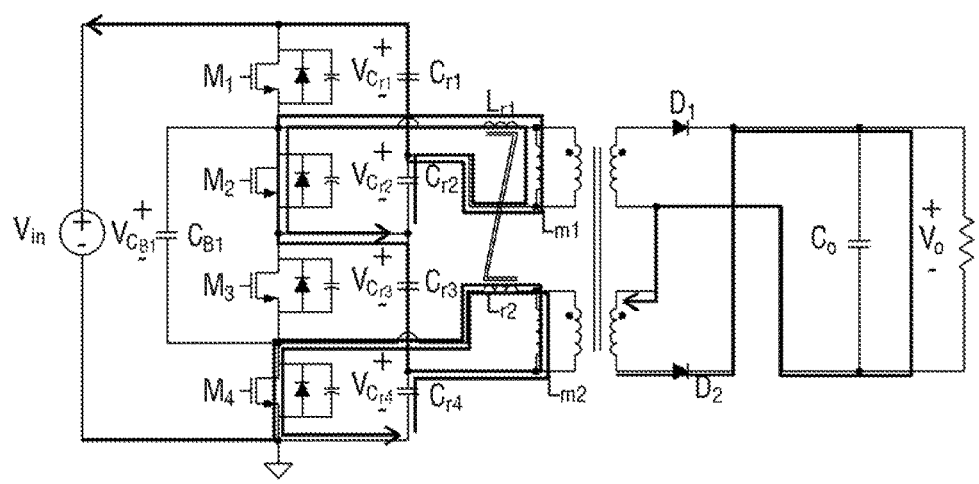

When the primary side current $I_{pri}$ flows in the negative direction ($t=t_3$), a fourth mode starts. A conduction path as illustrated in FIG. 9 is formed.

As illustrated in FIG. 10, since the primary side current $I_{pri}$ flows in the negative direction, the first and third resonance capacitors are charged and the second and fourth resonance capacitors are discharged. In addition, a current flowing toward an ideal transformer flows so as to exit from the primary dot direction of the transformer along the Kirchhoff's current law (KCL). Therefore, a secondary side current of the transformer flows so as to enter a secondary side dot direction of the transformer.

The fourth mode ends when the second and fourth switches $M_2$ and $M_4$ are turned off ($t=t_4$). In this case, the first balance capacitor voltage $V_{CB1}$ is maintained to be equal to the sum $V_{Cr1}+V_{Cr2}$ of the voltages across the first and second resonance capacitors.

As described above, the operation from the first mode to the fourth mode is represented based on one period and is repeated every period.

Figure 11:
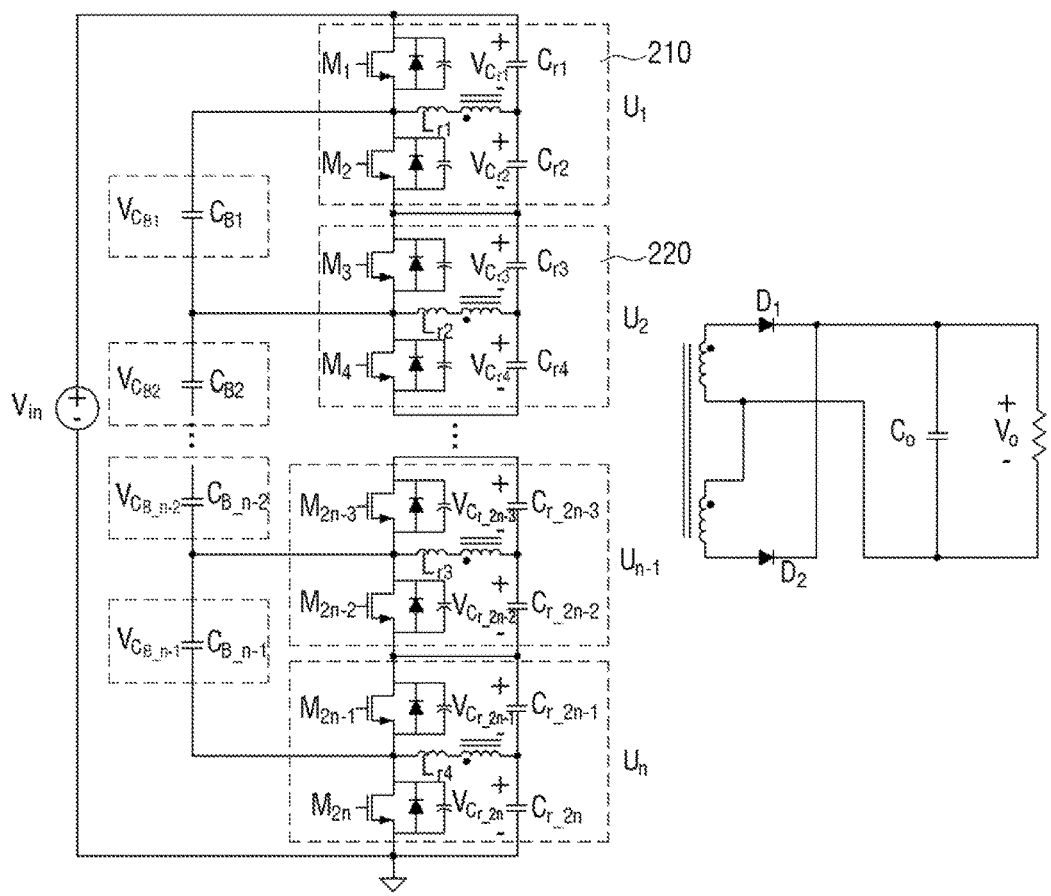
FIG. 11 is a circuit diagram illustrating an LLC resonant converter including a plurality of balancing capacitors.

FIG. 11 is a circuit diagram illustrating an LLC resonant converter including a plurality of balancing capacitors. The circuit diagram of FIG. 11 illustrates an expanded form in which a plurality of converter units are additionally connected in series with the above-mentioned circuit diagram.

Referring to FIG. 11, the LLC resonant converter has a primary side configured by connecting n converter units in series with each other. As a result, voltage stress across the switch is $V_{in}/n$, which is inversely proportional to the number of converter units. In this case, when each of the switches is driven, a first switch group including first, third, fifth, ..., 2n−1-th switches $M_1, M_3, M_5, \ldots, M_{2n-1}$ is driven together. In addition, a second switch group including second, fourth, sixth, ..., 2n-th switches $M_2, M_4, M_6, \ldots, M_{2n}$ is driven together. When the first switch group is turned on, the first capacitor voltage $V_{CB1}$ becomes equal to the voltage $V_{Cr1}+V_{Cr2}$ across of the first converter unit. In the same principle, a n−1-th balance capacitor voltage $V_{CB\_n-1}$ becomes equal to a voltage $V_{Cr\_2n-3}+V_{Cr\_2n-2}$ across the n-th converter unit.

Therefore, the following Mathematical Expressions may be acquired from the above-mentioned operation.

$$V_{CB1}=V_{Cr1}+V_{Cr2}=V_{Cr3}+V_{Cr4}$$

$$V_{CB\_n-1}=V_{Cr\_2n-3}+V_{Cr\_2n-2}=V_{Cr\_2n-1}+V_{Cr\_2n}$$

In the same principle, all balance capacitors ($V_{CB\_K}$; k=1, 2, 3, ... ) balances a voltage balance of the converter units connected to the balance capacitors. That is, the Mathematical Expression of $V_{CB\_n-1}=V_{Cr\_2n-3}+V_{Cr\_2n-2}=V_{Cr\_2n-1}+V_{Cr\_2n}$ may be equally applied to all balance capacitors. Therefore, the voltages of all balance capacitors and the voltages $V_{Cr\_2n-1}+V_{Cr\_2n}$ across the converter units are equal to each other.

In addition, a voltage $V_{Cr1}+V_{Cr2}+V_{Cr3}+V_{Cr4}+ \ldots + V_{Cr\_2n-3}+V_{Cr\_2n-2}+V_{Cr\_2n-1}+V_{Cr\_2n}$ across all converter units is equal to a voltage yin of an input voltage source.

Therefore, the voltages of all switches are guaranteed to $V_{in}/n$ by the above-mentioned Mathematical Expressions.

$$V_{in}/n=V_{CB1}=V_{CB2}=\ldots=V_{CB\_n-2}=V_{CB\_n-1}=V_{Cr1}+V_{Cr2}=V_{Cr3}+V_{Cr4}=\ldots=V_{Cr\_2n-1}+V_{Cr\_2n}$$

By increasing the number of basic units in the same method, the voltage balance of all switches may be guaranteed and the switch voltage stress may be further reduced to $V_{in}/n$ so as to be proportion to the number of units.

The LLC resonant converter according to an exemplary embodiment of the present disclosure may implement the voltage balance in all switch elements only by a passive element without requiring a semiconductor element for digital control and clamp. In addition, since the LLC resonant converter according to an exemplary embodiment of the present disclosure may maintain the voltage across the switches to $V_{in}/n$ by connecting the plurality of converter units and the plurality of balance capacitors to each other, loss caused by an overlap of the voltage and the current when the switch is turned off may be reduced.

As described above, although the present disclosure has been described with reference to the embodiments and the accompanying drawings, it is to be understood that the present disclosure is not limited thereto, and various variations and modifications may be made by those skilled in the art without departing from the spirit and scope of the present disclosure as defined by the appended claims.

What is claimed is:

1. An LLC resonant converter comprising:
   a multi input transformer;
   first and second converter units configured to be connected to a primary side of the multi input transformer;
   an input voltage part configured to apply a voltage to both ends at which the first and second converter units are connected in series with each other;
   a first balance capacitor configured to maintain a voltage between the first and second converter units to be consistent; and
   an output part configured to be connected to a secondary side of the multi input transformer,
   wherein the first converter unit includes a first part in which a first switch and a first resonance capacitor are connected in series with each other and a second part in which a second switch and a second resonance capacitor are connected in series with each other,
   the first part, the second part, and a primary side winding of the transformer are connected in parallel to each other, the first switch and the second switch are connected to each other, and the first resonance capacitor and the second resonance capacitor are connected to each other,
   the second converter unit includes a third part in which a third switch and a third resonance capacitor are connected in series with each other and a fourth part in which a fourth switch and a fourth resonance capacitor are connected in series with each other,
   the third part, the fourth part, and a secondary side winding of the transformer are connected in parallel to each other, the third switch and the fourth switch are connected to each other, and the third resonance capacitor and the fourth resonance capacitor are connected to each other, and
   the first balance capacitor is connected to a node between the first switch and the second switch and a node between the third switch and the fourth switch,
   wherein the voltage applied to the first converter unit is equal to a voltage charged in the first balance capacitor when the first switch and the third switch are turned on, and
   the voltage applied to the second converter unit is equal to the voltage charged in the first balance capacitor when the second switch and the fourth switch are turned on,
   further comprising a third converter unit and a second balance capacitor,
   wherein the third converter unit includes a fifth part in which a fifth switch and a fifth resonance capacitor are connected in series with each other and a sixth part in which a sixth switch and a sixth resonance capacitor are connected in series with each other,
   the fifth part, the sixth part, and a third input side winding of the transformer are connected in parallel to each other, the fifth switch and the sixth switch are connected to each other, and the fifth resonance capacitor and the sixth resonance capacitor are connected to each other, and
   the second balance capacitor has one end connected to a node between the third switch and the fourth switch and a node between the fifth switch and the sixth switch, and the other end connected to one end of the first balance capacitor.

2. The LLC resonant converter as claimed in claim 1, wherein the first balance capacitor has capacitance greater than the first to fourth resonance capacitors.

3. The LLC resonant converter as claimed in claim 2, wherein the first and second resonance capacitors have the same capacitance, and
   the third and fourth resonance capacitors have the same capacitance.

4. The LLC resonant converter as claimed in claim 1, wherein primary coils of the multi input transformer connected to the first and second converter units are wound around the same core as a secondary coil of the multi input transformer.

5. The LLC resonant converter as claimed in claim 1, wherein primary coils of the multi input transformer connected to the first and second converter units have the same number of turns.

6. The LLC resonant converter as claimed in claim 1, wherein the first balance capacitor and the second balance capacitor have the same capacitance.

7. The LLC resonant converter as claimed in claim 1, wherein the first and second balance capacitors have capacitance greater than the first resonance capacitor to the sixth resonance capacitor.

8. The LLC resonant converter as claimed in claim 1, wherein the voltage applied to the first converter unit is equal to a voltage charged in the first balance capacitor when the first switch, the third switch, and the fifth switch are turned on, the voltage applied to the second converter unit is equal to a voltage charged in the second balance capacitor when the first switch, the third switch, and the fifth switch are turned on, and is equal to the voltage charged in the first balance capacitor when the second switch, the fourth switch, and the sixth switch are turned on, the voltage applied to the third converter unit is equal to the voltage charged in the second balance capacitor when the second switch, the fourth switch, and the sixth switch are turned on, and the voltages charged in the first balance capacitor and the second balance capacitor, respectively, are equal to each other.

9. An electronic device comprising:
   an LLC resonant converter; and
   a processor configured to control the LLC resonant converter,
   wherein the LLC resonant converter includes
   a multi input transformer;
   first and second converter units configured to be connected to a primary side of the multi input transformer;

an input voltage part configured to apply a voltage to both ends at which the plurality of converter units are connected in series with each other;

a first balance capacitor configured to maintain a voltage between the plurality of converter units to be consistent; and an output part configured to be connected to a secondary side of the multi input transformer, the first converter unit includes a first part in which a first switch and a first resonance capacitor are connected in series with each other and a second part in which a second switch and a second resonance capacitor are connected in series with each other, the first part, the second part, and a primary side winding of the transformer are connected in parallel to each other, the first switch and the second switch are connected to each other, and the first resonance capacitor and the second resonance capacitor are connected to each other, the second converter unit includes a third part in which a third switch and a third resonance capacitor are connected in series with each other and a fourth part in which a fourth switch and a fourth resonance capacitor are connected in series with each other, the third part, the fourth part, and a secondary side winding of the transformer are connected in parallel to each other, the third switch and the fourth switch are connected to each other, and the third resonance capacitor and the fourth resonance capacitor are connected to each other, the first balance capacitor is connected to a node between the first switch and the second switch and a node between the third switch and the fourth switch, and the processor controls the first switch and the third switch to be turned on simultaneously and the second switch and the fourth switch to be turned on simultaneously, wherein the voltage applied to the first converter unit is equal to a voltage charged in the first balance capacitor when the first switch and the third switch are turned on, and the voltage applied to the second converter unit is equal to the voltage charged in the first balance capacitor when the second switch and the fourth switch are turned on, further comprising a third converter unit and a second balance capacitor, wherein the third converter unit includes a fifth part in which a fifth switch and a fifth resonance capacitor are connected in series with each other and a sixth part in which a sixth switch and a sixth resonance capacitor are connected in series with each other, the fifth part, the sixth part, and a third input side winding of the transformer are connected in parallel to each other, the fifth switch and the sixth switch are connected to each other, and the fifth resonance capacitor and the sixth resonance capacitor are connected to each other, and the second balance capacitor has one end connected to a node between the third switch and the fourth switch and a node between the fifth switch and the sixth switch, and the other end connected to one end of the first balance capacitor.

* * * * *